July 15, 1924.  
F. A. NIEBERDING  
COMBINED FLUID FUEL AND SOLID FUEL HEATING APPARATUS  
Filed July 22, 1918     3 Sheets-Sheet 2

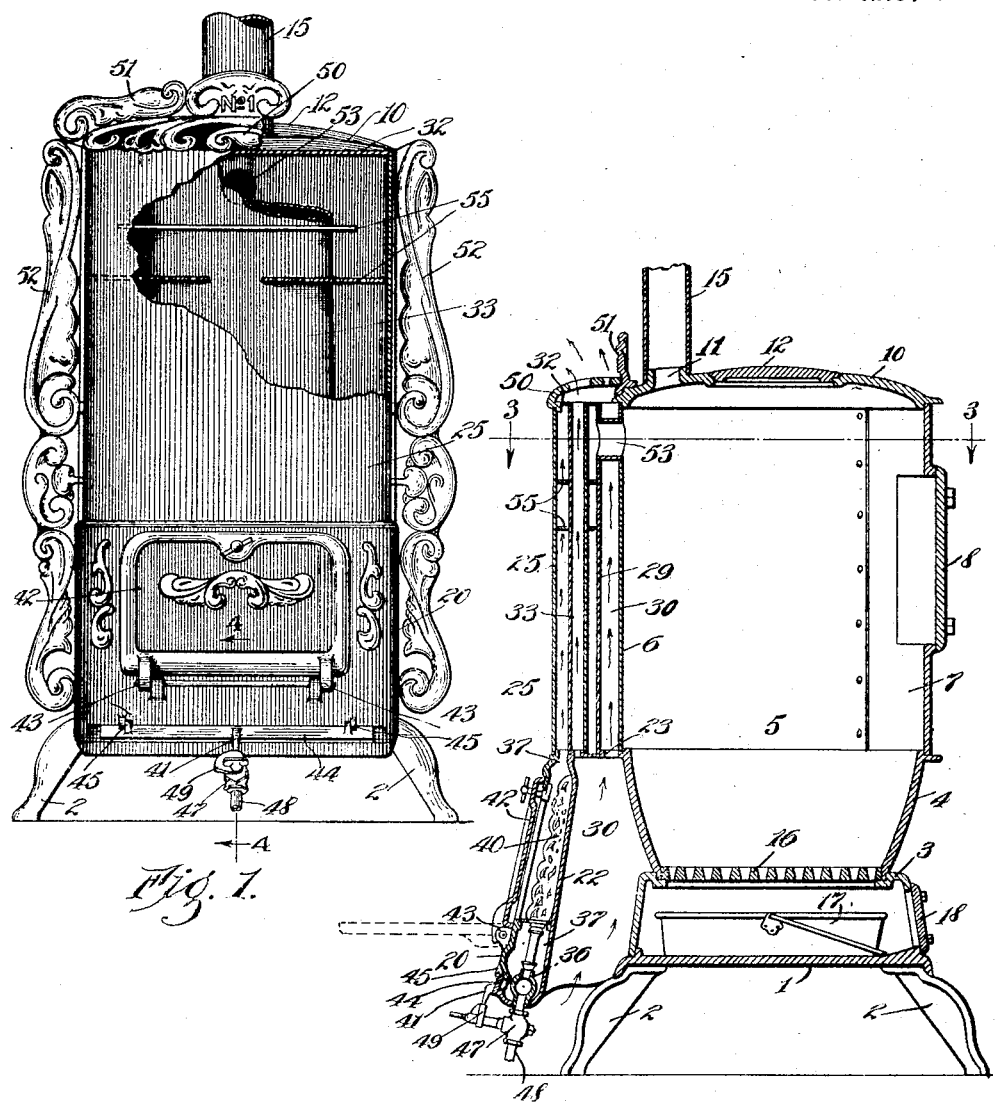

1,501,680

Inventor,
Frank A. Nieberding,
By Hull, Smith, Brock & West
Attys.

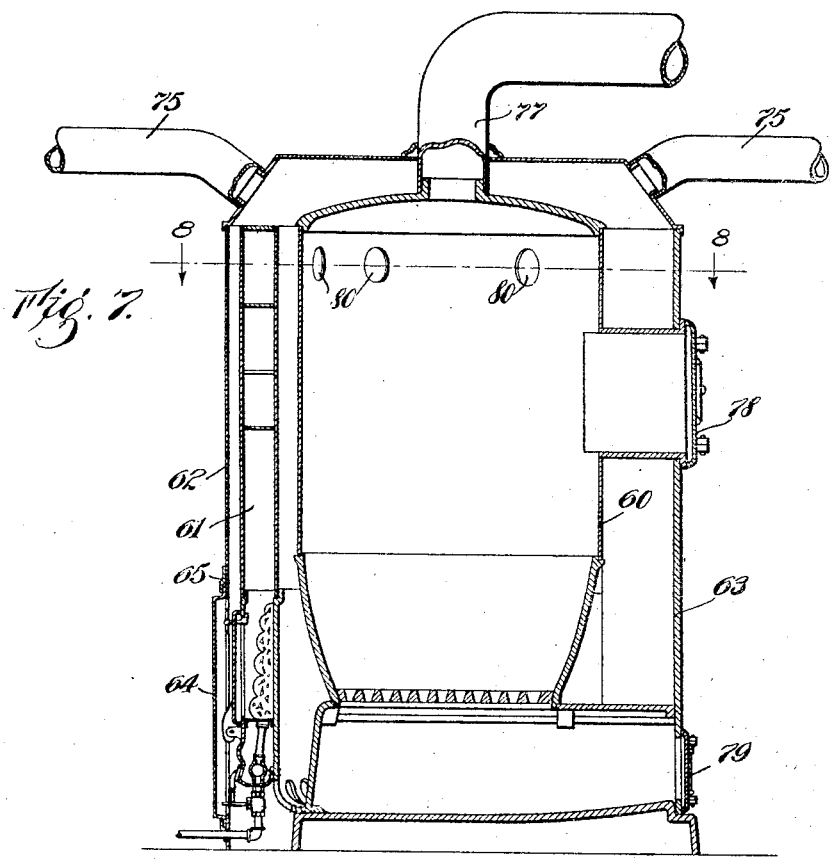
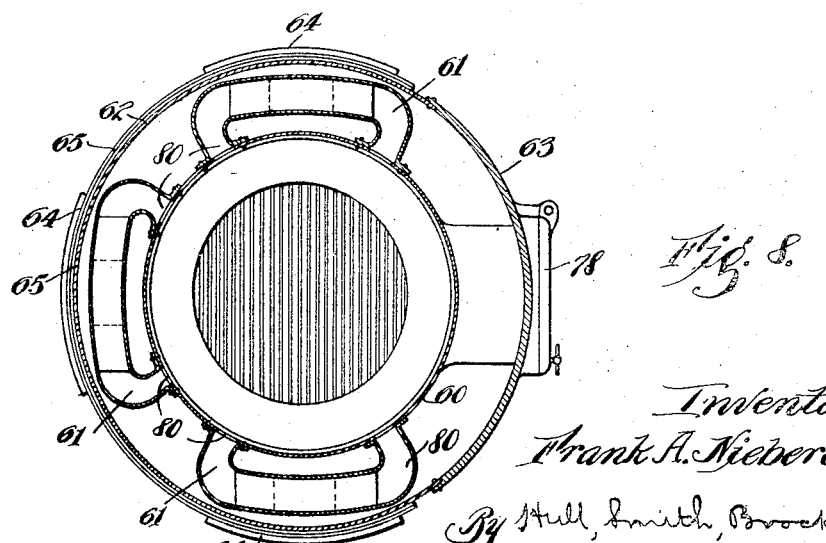

Patented July 15, 1924.

1,501,680

UNITED STATES PATENT OFFICE.

FRANK A. NIEBERDING, OF CLEVELAND, OHIO.

COMBINED FLUID-FUEL AND SOLID-FUEL HEATING APPARATUS.

Application filed July 22, 1918. Serial No. 246,000.

*To all whom it may concern:*

Be it known that I, FRANK A. NIEBERDING, a citizen of the United States, residing at Cleveland, in the county of Cuyahoga and State of Ohio, have invented a certain new and useful Improvement in Combined Fluid-Fuel and Solid-Fuel Heating Apparatus, of which the following is a full, clear, and exact description, reference being had to the accompanying drawings.

This invention relates to an improved combined fluid fuel and solid fuel heating apparatus, and has for its purpose the production of apparatus of this character which operates with equally high efficiency and economy on either kind of fuel and wherein the solid fuel heater—which is within itself of ordinary type—is rendered more effective by the presence of the fluid fuel heating structure.

Other objects comprehended by the invention are simplicity of construction and convenience of use. Further objects will appear as this description proceeds.

Figure 3:
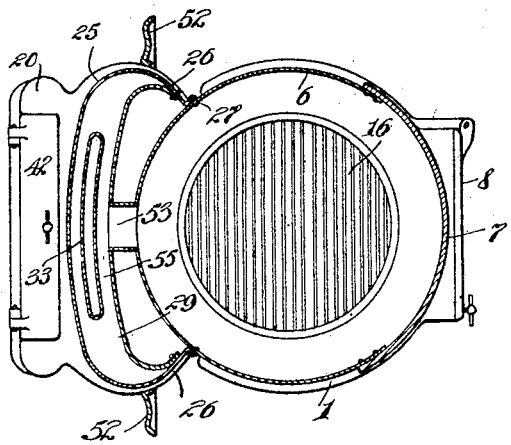
Figure 4:
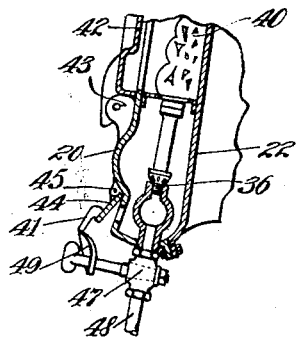
Figure 5:
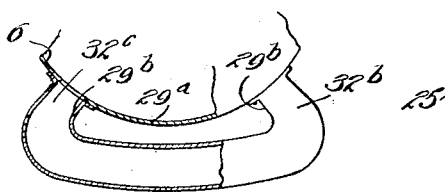
Figure 6:
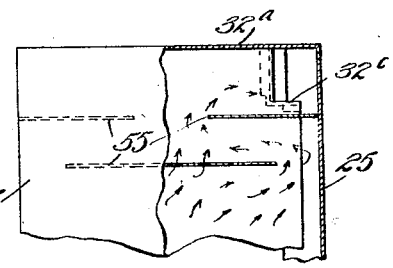

Referring now to the accompanying drawings, wherein modifications of my invention are illustrated through which the foregoing objects are attained, Fig. 1 is a front elevation and Fig. 2 a central vertical section at right angles to the plane of Fig. 1 of my improved heating apparatus. Fig. 3 is a section on the line 3—3 of Fig. 2; Fig. 4, a section on the line 4—4 of Fig. 1; Fig. 5 is a section similar to but embracing less than Fig. 3 of a modified form of the invention; Fig. 6 is a fragmentary front elevation, with a part of the casing broken away, of the modification shown in Fig. 5; and Figs. 7 and 8 are views similar to Figs. 2 and 3, respectively, of a furnace modification of the invention.

As previously stated, the portion of the apparatus wherein solid fuel is burned is, within itself, of ordinary type so far as is general make up and operation are concerned, and in the embodiments of the invention illustrated particularly in Figs. 1, 2 and 3, the same consists of a base 1 that is supported a suitable distance above the floor by legs 2 and is surmounted by an ashpit casing 3 whereon is supported the bowl 4 of the firepot 5 having an upward extension that rests upon the upper end of the bowl 4 and is made up preferably of a sheet metal drum 6 having a cast metal section 7 set into one side for carrying the door 8 which closes the feed opening; and the drum is closed at its upper end by a cast top 10, having a flue connection 11 and a central opening that is closed by a cover 12. A stove pipe 15 is shown as applied to the flue connection 11. A grate 16, which may be of any approved type, reposes within the bottom of the firepot; and the ashpit is provided with an opening through which access to an ashpan 17 may be had and which is closed by a door 18.

Extending preferably from the side of the solid fuel heater opposite the feed door 8—or from what may be regarded as the front of the apparatus—is a cast shell 20 which occupies approximately the zone of the bowl 4 and ashpit casing 3, and is secured at its ends to the stove structure. Spaced inward from the front wall of the shell 20 is a back wall 22 which may be connected at its ends to the inwardly directed end walls of the shell. A sheet metal casing 25 has its lower end joined to the upper end of the shell 20 and rises therefrom to substantially the plane of the top of the solid fuel heater. As clearly indicated in Fig. 3, the sides 26 of the casing 25 are turned inward and connected to the drum portion 6, as indicated at 27. A plate 29 extends from one side wall to the other of the casing 25 and is spaced inward from its front wall. This plate connects at its lower end with a plate 23 disposed transversely of the upper end of the shell 20. The rear edge of the plate 23 is spaced from the wall of the solid fuel heater to permit the passage of air upward through what I may term an air circulating space 30 between the casings of the fluid and solid fuel heaters, the same being open at top and bottom. The space between the front wall of the casing 25 and the plate 29 is closed at its upper end by a top plate 32. A tubular member 33 is disposed vertically within the casing 25 and opens at its upper end through plate 32, and at its lower end through the plate 23 into the space to the rear of the back wall 22, that is, into the lower end of the air circulating space 30.

A fluid fuel burner 36 is disposed within the lower portion of what I shall term the fluid fuel combustion chamber 37, enclosed at the lower end by the shell 20 and throughout its upper end portion by the casing 25 and plate 29; and artificial fuel elements 40 are shown as supported in operative relation to the burner 36 and are inclined against the back wall 22. A door 42 is shown as hinged, at 43, to the shell 20 on a horizontal axis so that from a position closing the opening on the front of the shell 20 it may be swung downward to the position indicated in dotted lines in Fig. 2 to serve as a fender. A drop damper 44 in the form of a long narrow door is hinged at 45 to the front of the shell 20 and normally closes an air admitting opening therein. This drop damper is automatically raised to admit air into the combustion chamber when the valve 47 (through which the supply of liquid fluid from the pipe 48 is controlled to the burner 36) is opened, by the action of a cam 49, carried by the valve stem, upon a projection 41 of the drop damper. A grid 50, preferably of ornamental character extends across the upper end of the casing 25; and ornamental top and side plates 51 and 52, respectively, are applied to the casing to improve its appearance and conceal somewhat the solid fuel heater from the front.

The fluid fuel combustion chamber 37 has communicative connection with the firepot or combustion chamber of the solid fuel heater through a duct or connection 53 extending from one to the other of and opening through the plate 29 and drum section 6.

Considering the operation of the apparatus, it will be readily understood that by opening the door 42 and manipulating the valve 47, the burner 36 may be lighted, the operation of the valve automatically lifting the damper drop 44 to admit air in proper quantity to promote combustion and create the necessary draft upward through the combustion chamber 37, it being optional, ordinarily, whether the door 42 be closed or open. When the flue is cold and the air therein accordingly heavy it is preferable to have the door 42 closed in order to increase the draft until the flue becomes heated and conditions are normal. The resultant heated condition of back wall 22 and the plate 29 creates an up draft through the circulating space 30, the air rising through such space becoming thoroughly heated by contact with or by the heat radiated from the back wall and plate. A part of the air which rises through the duct or tubular member 33 becomes thoroughly heated by reason of the proximity of the duct to the products of combustion circulating upward through the combustion space or chamber. The course of the heated air is indicated by arrows in the drawings.

When it is desired to use the solid fuel heater, it is only necessary to close the door 42 (the damper drop 45 being closed by reason of the closed condition of the valve 47) to shut off any draft through the fluid fuel combustion space, and kindle a fire in the combustion chamber 5, the products therefrom rising through the flue or pipe 15, as usual. Upon reflection, it will be seen that the efficiency of the solid fuel heater is enhanced by the presence of the fluid fuel structure because of that fact that an actual circulation is created through the space 30, and within the room where the heater is situated instead of affecting the heating of the surrounding atmosphere purely by radiation, as would be the case if the air circulating space 30 were not provided.

The upper end of the fluid fuel combustion space or chamber is shown slightly modified in Figs. 5 and 6 where the upper corners of the plate $29^a$ (corresponding to the former plate 29) are cut inward from their side edges and turned rearwardly and connected to the drum section 6, as indicated at $29^b$. The top plate $32^a$ (corresponding to the former plate 32) has rearward extensions $32^b$ which project across the tops of the flues provided by the side walls of the casing member 25 and the opposed portions $29^b$, and a small plate $32^c$ closes the bottom of these flues, the flues registering with openings in the drum section 6.

In both modifications so far described, baffle plates 55 are situated within the fluid fuel combustion space in such manner as to produce a tortuous passageway for the products and thoroughly distribute them within the combustion space and retard their passage therethrough so as to obtain their maximum heating effect.

In Figs. 7 and 8 I have illustrated my invention incorporated in a furnace where the casing 60, enclosing the solid fuel combustion chamber, is partly surrounded by spaced fluid fuel heaters 61 that are shown as conforming more or less closely to the second modification, the entire assembly being then enclosed within an outer jacket 62 which has a front 63 set into one side in accordance with prevailing furnace practice. Access to the fluid fuel combustion chambers may be had through doors 64 shown as slidable in ways 65. One or more fluid fuel heaters may be incorporated in a furnace of this kind, and each may be of any width desired within the limits of the structure.

The furnace is equipped with the usual heat distributing pipes 75, flue 77, feed door 78, and ashpit door 79. The fluid fuel combustion spaces or chambers are communicatively connected with the solid fuel combustion chamber through flue connections 80.

Having thus described my invention, what I claim is:—

1. The combination with a solid fuel stove having a fire pot and a drum, of a fluid fuel combustion chamber, a burner therein, a casing extending upwardly therefrom, the said chamber and casing being spaced from the fire pot and drum respectively, and said space being closed at the sides and open at the top and bottom and forming an air heating passage extending upwardly between the fire pot and said combustion chamber and between the drum and said casing.

2. The combination set forth in claim 1, and an additional air duct extending upwardly within the said casing.

3. The combination set forth in claim 1, the said casing having an outlet near the top into said drum.

4. The combination set forth in claim 1, and means for shutting off flow through the said combustion chamber and casing.

5. The combination set forth in claim 1, the side walls of the said casing being turned inwardly and connected to the drum, to form the sides of said air passage.

6. The combination set forth in claim 1, the said casing having baffle plates therein forming a tortuous passage within said casing for the products of fluid fuel combustion.

7. In apparatus of the character set forth, the combination of a solid fuel combustion chamber and an ashpit below said chamber, said chamber and ashpit having doors at one side through which access may be had thereto, a casing attached to the side of the chamber opposite said doors and spaced therefrom to provide an air circulating space therebetween, and a fluid fuel burner disposed below the casing and supplying products of combustion thereto.

8. In apparatus of the character set forth, the combination of a solid fuel combustion chamber, a casing connected to the side of the chamber and consisting of a plate spaced from the chamber wall and turned inward at its sides and connected therewith, a plate between the former plate and the wall of the chamber and having its side edges connected to the inturned side portions of the former plate, the space between said plates constituting a passage for the products of fluid fuel combustion, a plate closing the passage at its upper end, a fluid fuel burner situated to discharge its products of combustion into the said passage, and a common flue through which the products are discharged from both combustion chambers.

9. In apparatus of the character set forth, the combination of a solid fuel combustion chamber, a plate spaced from and extending part way around the chamber and having its side edges turned inward and connected to the chamber wall, a plate between the chamber wall and the former plate and having its side edges connected to the inturned side portions of the former plate, the space between the plates constituting a passage, a closure for the top of said passage, a casing connected with the lower ends of said plates, a burner disposed within said casing, and a common flue through which the products from both said chamber and passage are discharged.

10. Apparatus of the character set forth comprising a solid fuel stove, a smoke chamber mounted and spaced from one side of the combustion chamber of said stove to provide an air passage, a casing spaced from the fire pot of the stove and opening at its top into the smoke chamber, and a fluid fuel burner in said casing.

In testimony whereof, I hereunto affix my signature.

FRANK A. NIEBERDING.